United States Patent [19]

Dück

[11] 4,355,815
[45] Oct. 26, 1982

[54] PISTON RING

[75] Inventor: Gerhard Dück, Burscheid, Fed. Rep. of Germany

[73] Assignee: Goetze AG, Burscheid, Fed. Rep. of Germany

[21] Appl. No.: 175,851

[22] Filed: Aug. 6, 1980

[30] Foreign Application Priority Data

Aug. 21, 1979 [DE] Fed. Rep. of Germany ....... 2933702

[51] Int. Cl.³ .............................................. F16J 9/20
[52] U.S. Cl. .................................... 277/143; 277/173; 277/206 R
[58] Field of Search ............... 277/143, 140, 141, 142, 277/173, 178, 205, 206 R, 216

[56] References Cited

U.S. PATENT DOCUMENTS

| 1,418,918 | 6/1922 | Hall | 277/143 |
| 2,387,855 | 10/1945 | Phillips | 277/216 |
| 3,806,137 | 4/1974 | Prasse et al. | 277/205 |
| 3,813,106 | 5/1974 | Hill | 277/173 |
| 3,980,310 | 9/1976 | Packard et al. | 277/173 |

FOREIGN PATENT DOCUMENTS 2107563 8/1972 Fed. Rep. of Germany .

Primary Examiner—Robert I. Smith
Attorney, Agent, or Firm—Spencer & Kaye

[57] ABSTRACT

A cross-sectionally U-shaped radially inwardly open piston ring for a piston slidably received in a cylinder and dividing the cylinder into a high-pressure side and a low-pressure side. The piston ring includes first and second radially inwardly projecting, circumferentially extending legs for being received in respective grooves of the piston, while straddling a radially outwardly projecting, circumferentially extending web forming part of the piston. That leg which is closer to the high-pressure side than the other leg when the piston ring is in place on the piston, is resiliently deformable in a direction parallel to the axis of the piston in response to pressures prevailing at the high-pressure side, whereby the leg is circumferentially pressed against the web forming part of the piston.

4 Claims, 3 Drawing Figures

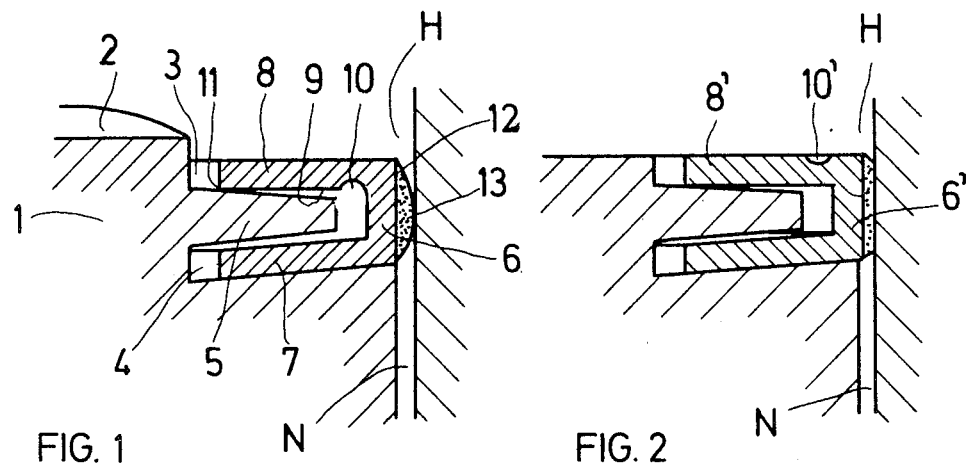
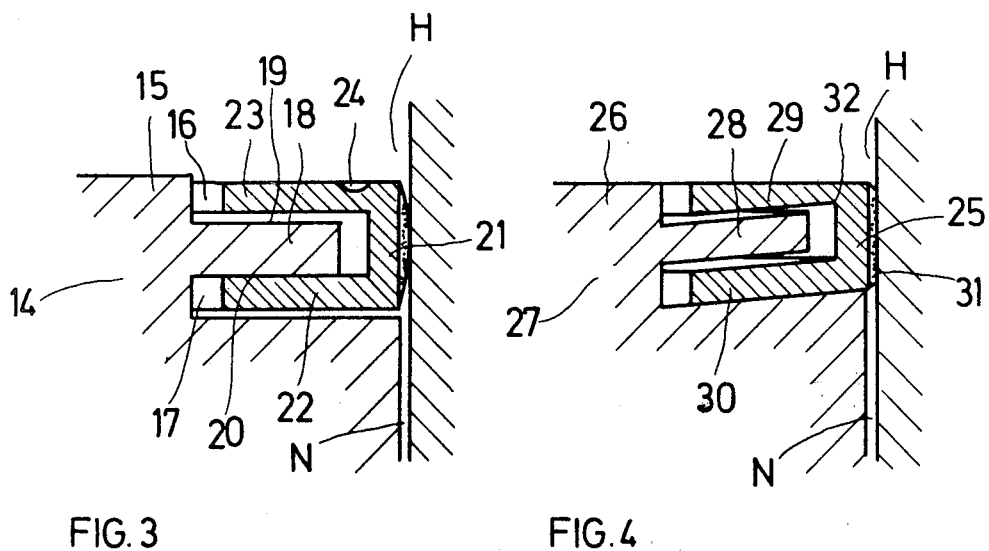

PISTON RING

BACKGROUND OF THE INVENTION

This invention relates to a piston ring, particularly for internal combustion engines. The piston ring has a radially inwardly open U-shaped cross section and is adapted to be seated in a circumferential piston groove having a central circumferential web adapted to extend between the two circumferential, radially inwardly projecting legs of the piston ring.

U.S. Pat. No. 3,813,106 discloses a compression-type piston ring which is adapted for use in an internal combustion engine and which is made of gray iron. The piston ring has a U-shaped cross section and is seated in its installed state with a radial and axial play in a piston groove which corresponds to the cross-sectional outline of the piston ring and which is open towards the head face of the piston. Due to the intentionally asymmetrical cross section of the piston ring, during service the piston ring is distorted (twisted) in the piston groove. It is a desideratum that the piston ring leg which is oriented towards the high-pressure side (combustion chamber), abuts the central web provided in the groove upon the explosive combustion following ignition to thus ensure that the high gas pressure cannot have any effect behind the piston ring. Further, a deposition of combustion residues behind the piston ring is prevented; such residues could adversely affect the freedom of motion of the piston ring in the piston groove. The continuous twisting of the piston ring during operation, however, results in the following disadvantages:

ring or web breakage may occur;

a significant and non-uniform wear of the ring flanks occurs because of the exclusive linear contact during the guidance of the piston ring in the piston groove;

a non-uniform wear of the running faces occurs because of the varying contact areas between the piston ring and the cylinder wall; and significant wear of the running face of the cylinder occurs.

German Laid-Open Application (Offenlegungsschrift) No. 2,107,563 discloses a compression-type piston ring made of a bent steel strip which likewise has a U-shaped cross-sectional configuration. The ring is seated with a radial and an axial play in a piston groove which corresponds to the cross-sectional outline of the piston ring and which is open towards the head face of the piston. The piston ring leg which is oriented towards the high-pressure side (combustion chamber) is flush with the head face of the piston and further, a gap is formed between the bottom of the groove and the piston ring leg. The piston ring is, by means of the ring leg oriented towards the low-pressure side, guided in the corresponding groove of the piston, while the ring leg oriented towards the high-pressure side extends in the piston groove without play. During compression and combustion, the piston ring is pressed against the cylinder wall by the high-pressure gas which is capable of gaining access to the space behind the piston ring via the above-noted gap. The forceful and non-uniform pressing of the piston ring against the cylinder wall aided by the gas pressure causes the running face to be exposed to significant and non-uniform wear. Therefore, expensive wear-resistant materials are required for the interfaces. Further, in this structure too, the risks are very high that combustion residues accumulate behind the piston ring; these residues harden during service and thus may lead to a limitation of the freedom of motion of the piston ring.

SUMMARY OF THE INVENTION

It is an object of the invention to provide an improved piston ring of the above-outlined type wherein gas pressure peaks behind the piston ring are avoided without a twisting of the ring and thus the entire wear characteristics such as flank wear and running face wear are advantageously affected.

This object and others to become apparent as the specification progresses, are accomplished by the invention, according to which, briefly stated, the piston ring leg oriented towards the high-pressure side of the medium to be sealed is resiliently deformable in the axial direction towards the circumferential web extending in the center of the groove.

The resilient deformability is achieved preferably by providing the piston ring leg at its surface oriented away from the web and/or the surface oriented towards the web with circumferentially extending recesses. By virtue of these recesses, the ring leg oriented towards the high-pressure side is weakened to such an extent that during the compression stroke of the piston, the ring leg functions as a valve. Thus, in response to pressure, the free end of the ring leg bends elastically and, at least with a linear contact, sealingly engages the centrally extending web. In this manner the high gas pressure which is generated particularly during combustion, is prevented from becoming effective at the other inner circumferential faces of the piston ring and furthermore, there will be no disadvantageous deposits of combustion residues between the piston ring and the base of the groove. In order to achieve an optimum efficiency during the valve-like closing of the ring leg, the recesses are arranged preferably in the radially outer circumferential leg zone. In order to avoid notch effects, according to a further feature of the invention, the recesses are rounded in the ring leg and have approximately a semicircular configuration.

Similarly to the prior art outlined above, the piston rings according to the invention may be made of gray iron or of steel strips and thus are versatile in their application. The characteristics of the invention may find application not only in piston rings for internal combustion engines but, for example, in compressors as well as hydraulic or pneumatic piston-and-cylinder assemblies which operate under high or under alternating median pressures. For such devices it is expedient to manufacture the piston ring from the materials which best correspond to the operating conditions of the machine. The piston rings may have fabric or metal inserts.

BRIEF DESCRIPTION OF THE DRAWING

FIGS. 1 through 3 are axial sectional views of three preferred embodiments of the invention.

DESCRIPTION OF THE PREFERRED EMBODIMENTS

The piston rings shown in FIGS. 1 through 3 all have a U-shaped cross-sectional outline and, among the plurality of piston rings on each piston, are the closest to the high-pressure side of, for example, an internal combustion engine.

Turning now to FIG. 1, there is illustrated a piston 1 provided, adjacent to its head face 2, with a circumferential recess 3 which is open towards the head face 2. A groove 4 is provided in the piston 1, axially spaced from the recess 3. Between the recess 3 and the groove 4 there is defined a circumferentially extending, collar-like, cross-sectionally frustoconical web 5. A cross-sectionally U-shaped piston ring generally indicated at 6 has a first radial circumferential leg 7 which is received in the groove 4 and a second radial circumferential leg 8 which is received in recess 3. The piston ring is received in the recess 3 and the groove 4 with a radial and an axial play. The legs 7 and 8 are joined together, at their outer circumferential ends, by an annular connecting portion 33. The ring leg 8 oriented towards the high-pressure side H has, near the connecting portion 33, in the radially outer circumferential zone of its inner surface 9 oriented towards the web 5, a circumferential, groove-like recess 10 which has a semicircular cross-sectional shape. By virtue of the weakened part of the leg 8 (caused by the recess 10), during pressure periods at the high-pressure side H, an inner end portion 11 of the radial leg 8 engages the corresponding part of the web 5 at least in a linear contact and thus prevents gas pressure from having any effect behind the piston ring. The ring leg 7 oriented towards the low-pressure side N conically slopes towards the outer axial surface of the connecting portion 33 forms a running face 12 of the piston 1. The running face 12 which is conventionally provided with a coating 13.

Turning now to FIG. 2, the piston ring 6' is structured similarly to that shown in FIG. 1, except that a cross-sectionally semicircular groove-like weakening recess 10' is provided in the radially outer circumferential zone of the radial leg 8' oriented towards the high-pressure side H.

Turning now to FIG. 3, there is shown a piston 14 wherein in the head face 15 there is provided a circumferential recess 16 and, axially spaced therefrom, there is provided a groove 17 in such a manner that a web 18 defined between the recess 16 and the groove 17 has parallel lateral surfaces 19 and 20. A piston ring 21 of U-shaped cross section is supported in the recess 16 and the groove 17 such that the radial leg 22 of the piston ring 21 is received in the groove 17 and the radial leg 23 of the piston ring 21 is received in the recess 16 with an axial and a radial play. Similarly to the embodiment of FIG. 2, the zone of weak bending resistance is at the outer surface of the leg 23 and is effected by a semicircular, circumferentially extending groove-like recess 24.

As seen in the embodiments illustrated in FIGS. 1, 2 and 3, the cross-sectional configuration of the piston ring, particularly the dimensions and the course of the legs of the "U", are symmetrical with respect to a central radial plane A extending perpendicularly to the longitudinal axis of the piston ring. The plane A is oriented perpendicularly to the plane of the drawing in FIGS. 1, 2 and 3.

It will be understood that the above description of the present invention is susceptible to various modifications, changes and adaptations, and the same are intended to be comprehended within the meaning and range of equivalents of the appended claims.

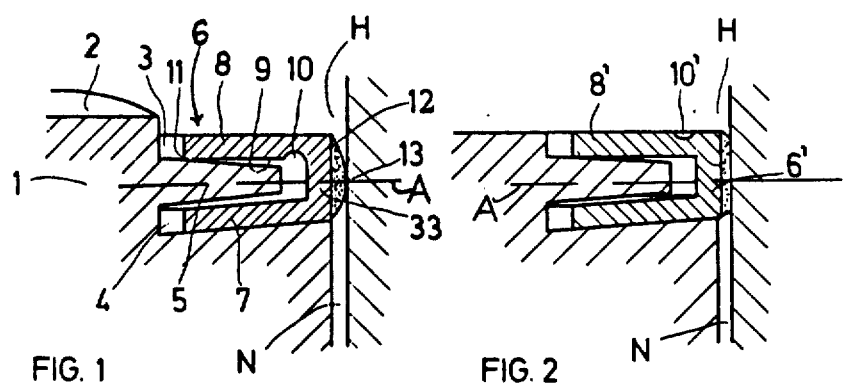

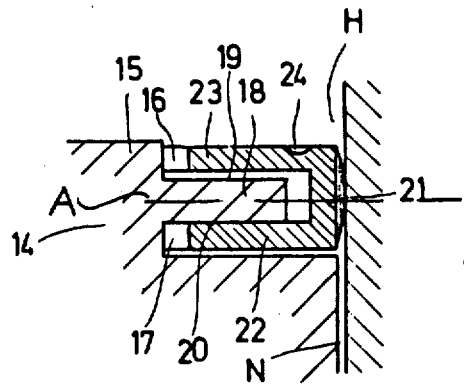

What is claimed is:

1. In a cross-sectionally U-shaped, radially inwardly open piston ring for a piston slidably received in a cylinder; the piston ring having an axis and including first and second radially inwardly projecting, circumferentially extending legs having outer circumferential ends; said piston ring further including an annular connecting portion joining said legs at said outer circumferential ends; the improvement wherein said legs are, in course and dimensions, symmetrical to one another relative to a central radial plane of the piston ring; said central radial plane extending perpendicularly to said axis of said piston ring; further comprising means defining a circumferential recess in a radially outer circumferential zone of said first leg near said annular connecting portion for rendering said first leg resiliently swingable in a direction parallel to the axis of the piston ring, so that when said piston ring is in place on said piston, with said legs received in respective grooves of the piston while straddling a radially outwardly projecting, circumferentially extending web forming part of the piston, said first leg is circumferentially pressable against said web by pressures prevailing at said high-pressure side.

2. A piston ring as defined in claim 1, said weakening means circumferentail recess having a cross section.

3. A piston ring as defined in claim 2, wherein said recess is provided on an outer face of said first leg.

4. A piston ring as defined in claim 2, wherein said recess is provided on an inner face of said first leg.

* * * * *

UNITED STATES PATENT AND TRADEMARK OFFICE
CERTIFICATE OF CORRECTION

PATENT NO. : 4,355,815

DATED : October 26, 1982

INVENTOR(S) : Gerhard Dück

Page 1 of 3

It is certified that error appears in the above-identified patent and that said Letters Patent is hereby corrected as shown below:

The title page and sheet 1 of the drawings containing Figs. 1, 2 and 3 should appear as shown on the attached sheet.

Signed and Sealed this

Nineteenth Day of July 1983

[SEAL]

Attest:

Attesting Officer

GERALD J. MOSSINGHOFF

Commissioner of Patents and Trademarks

United States Patent [19]

Dück

[11] 4,355,815
[45] Oct. 26, 1982

[54] PISTON RING

[75] Inventor: Gerhard Dück, Burscheid, Fed. Rep. of Germany

[73] Assignee: Goetze AG, Burscheid, Fed. Rep. of Germany

[21] Appl. No.: 175,851

[22] Filed: Aug. 6, 1980

[30] Foreign Application Priority Data

Aug. 21, 1979 [DE] Fed. Rep. of Germany ....... 2933702

[51] Int. Cl.³ .............................................. F16J 9/20
[52] U.S. Cl. ................................... 277/143; 277/173; 277/206 R
[58] Field of Search ............... 277/143, 140, 141, 142, 277/173, 178, 205, 206 R, 216

[56] References Cited

U.S. PATENT DOCUMENTS

| 1,418,918 | 6/1922 | Hall | 277/143 |
| 2,387,855 | 10/1945 | Phillips | 277/216 |
| 3,806,137 | 4/1974 | Prasse et al. | 277/205 |
| 3,813,106 | 5/1974 | Hill | 277/173 |
| 3,980,310 | 9/1976 | Packard et al. | 277/173 |

FOREIGN PATENT DOCUMENTS 2107563 8/1972 Fed. Rep. of Germany.

Primary Examiner—Robert I. Smith
Attorney, Agent, or Firm—Spencer & Kaye

[57] ABSTRACT

A cross-sectionally U-shaped radially inwardly open piston ring for a piston slidably received in a cylinder and dividing the cylinder into a high-pressure side and a low-pressure side. The piston ring includes first and second radially inwardly projecting, circumferentially extending legs for being received in respective grooves of the piston, while straddling a radially outwardly projecting, circumferentially extending web forming part of the piston. That leg which is closer to the high-pressure side than the other leg when the piston ring is in place on the piston, is resiliently deformable in a direction parallel to the axis of the piston in response to pressures prevailing at the high-pressure side, whereby the leg is circumferentially pressed against the web forming part of the piston.

4 Claims, 3 Drawing Figures

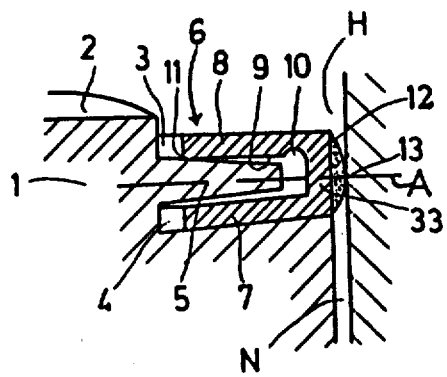

UNITED STATES PATENT AND TRADEMARK OFFICE
CERTIFICATE OF CORRECTION

PATENT NO. : 4,355,815
DATED : October 26, 1982
INVENTOR(S) : Gerhard Dück

It is certified that error appears in the above-identified patent and that said Letters Patent is hereby corrected as shown below: